252-79.2 SR
6/2/87 OR H 000,284

United States Statutory Invention Registration [19]

[11] Reg. Number: H284
[43] Published: Jun. 2, 1987

Wegman et al.

[54] NON-CARCINOGENIC, NON-POLLUTING SULFURIC ACID ETCHANTS FOR PREPARING ALUMINUM SURFACES FOR ADHESIVE BONDING

[75] Inventors: Raymond F. Wegman, Ledgewood; Michael J. Bodnar, Rockaway; David W. Levi, Succasunna, all of N.J.

[73] Assignee: The United States of America as represented by the Secretary of the Army, Washington, D.C.

[21] Appl. No.: 841,386

[22] Filed: Feb. 24, 1986

[51] Int. Cl.[4] ..... C09K 13/04; B05D 3/10; C23F 1/20; C23F 1/44

[52] U.S. Cl. ..... 252/79.2; 252/142; 156/629; 156/630; 156/656; 156/665; 156/330; 427/307; 427/309; 134/3; 134/41

[58] Field of Search ..... 252/79.2, 142; 156/629, 156/630, 656, 665, 330; 427/307, 309; 134/3, 41

[56] References Cited

U.S. PATENT DOCUMENTS 4,395,305 7/1983 Whitman ..... 252/79.2 X

*Primary Examiner*—John F. Terapane
*Assistant Examiner*—J. E. Thomas
*Attorney, Agent, or Firm*—Anthony T. Lane; Robert P. Gibson; Edward F. Costigan

[57] ABSTRACT

The invention provides a process and composition of low toxicity for preparing aluminum surfaces for adhesive bonding. According to the invention non-carcinogenic, non-polluting soluble metal salts generally, other than ferric sulfate disclosed in U.S. Pat. No. 4,212,701, when added in an effective amount to sulfuric acid, improve the adhesive bonding to aluminum when the aluminum is treated with such salt-sulfuric acid etchants prior to adhesive bonding.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Shear Strength Results At Room Temperature And 140°F Using P2, P3, P4, And P5 Etchants For 2024T3 Aluminum Bonded With Ea 9628NW Adhesive.

Stressed Durability Results Using P2, P3, P4, And P5 Etchants For 2024T3 Bare Aluminum Bonded With Ea 9628NW Adhesive.

Stressed Durability Results Using P2, P3, P4, And P5 Etchants For 2024T3 Clad Aluminum Bonded With Ea 9628NW Adhesive.

NON-CARCINOGENIC, NON-POLLUTING SULFURIC ACID ETCHANTS FOR PREPARING ALUMINUM SURFACES FOR ADHESIVE BONDING

GOVERNMENTAL INTEREST

The invention described herein may be manufactured, used and licensed by or for the Government for Governmental purposes without payment to us of any royalties thereon.

BACKGROUND OF THE INVENTION

U.S. Pat. No. 4,212,701 discloses an improved procedure for preparing aluminum surfaces for adhesive bonding, which comprises etching the aluminum surface with an etching bath consisting essentially of a mixture of aqueous sulfuric acid and ferric sulfate. The procedure eliminates the pollution problem and toxic and carcinogenic fumes associated with the conventional procedures, wherein the aluminum is etched with an aqueous solution of sulfuric acid and sodium dichromate; and it produces aluminum surfaces, which when adhesively bonded, provide joint strengths comparable to those obtained using the standard sulfuric acid-sodium dichromate etch. In a further study of the process of U.S. Pat. No. 4,212,701, it was suggested that the ferric ion in the ferric sulfate-sulfuric acid etchant for aluminum functions by both retarding sulfuric acid attack on the surface and by oxidative attack of ferric ion on aluminum and copper (R. F. Wegman, D. W. Levi, K. M. Adelson and M. J. Bodnar, "The Function of the P2 Etch in Treating Aluminum Alloys for Adhesive Bonding", Proceedings, 29th National SAMPE Symposium, April 3–5, 1984, p. 273.

BRIEF SUMMARY OF THE INVENTION

This invention relates to a novel process and composition for etching aluminum, which involves the use of other soluble non-carcinogenic, non-polluting metal salts as additives to aqueous sulfuric acid etchant for aluminum to improve the adhesive bonding to aluminum. The present invention is based on the discovery that in addition to the ferric sulfate salt disclosed in U.S. Pat. No. 4,212,701, other soluble non-carcinogenic, non-polluting metal salts generally, when incorporated in an effective amount into an etchant composition consisting essentially of aqueous sulfuric acid, are effective for improving the adhesive bonding to aluminum when the aluminum is etched with such a salt-sulfuric acid solution prior to adhesive bonding.

DETAILED DESCRIPTION OF THE INVENTION

Figure 1:
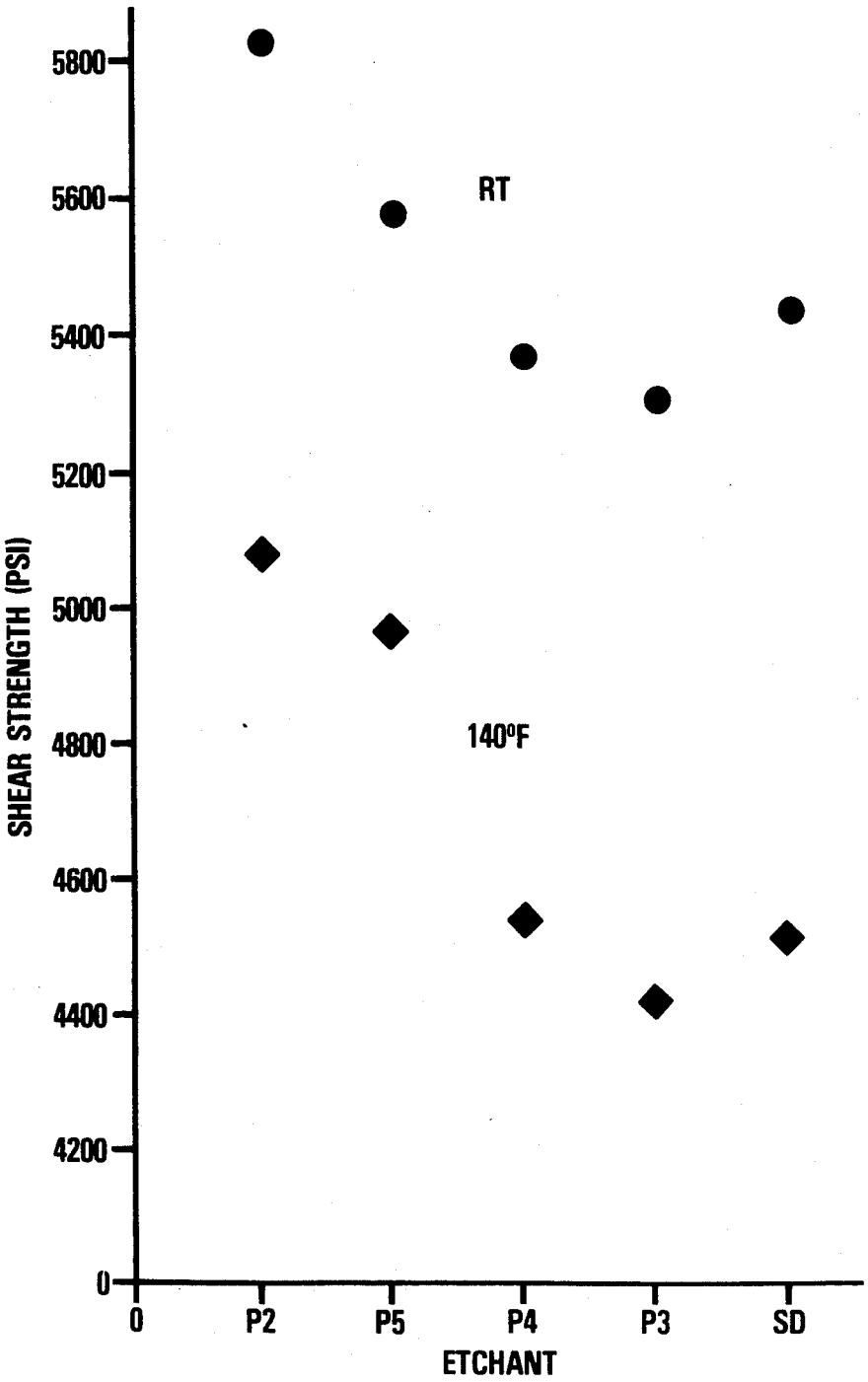
FIG. 1 shows a chart comparing the shear strength of adhesive bonds obtained with the etchants of the present invention and prior art etchants.

The process of the present invention can be carried out by contacting the aluminum (which term includes bare or clad aluminum as well as aluminum alloys consisting predominantly of aluminum) with an etchant composition consisting essentially of aqueous sulfuric acid and one or more soluble, non-polluting, non-carcinogenic metal salts other than ferric sulfate. Suitable metal salts include ferric nitrate, ferrous sulfate, and magnesium sulfate. The metal salt is employed in an amount which is effective to improve the adhesive bonding to aluminum when the aluminum is etched with the salt-sulfuric acid both prior to bonding, as compared to that similarly obtained in the absence of the metal salt. The amount of metal salt employed can vary widely and depends on the particular salt utilized. Suitable etchant compositions for carrying out the process of the present invention contain sulfuric acid, metal salt and water in proportions equivalent to the following:

| | Weight Percent |
|---|---|
| Sulfuric acid 96% sp. gr. 1.84 | 25 to 35 |
| metal salt, anhydrous basis | 5% to saturated solution |
| water | 50 to 70 |

Metal salts containing a metal cation in a higher rather than a lower oxidation state are generally more effective for promoting adhesive bonding of aluminum when employed in the etchant baths of the present invention, and hence are preferred. Ferric nitrate is a particularly effective metal salt for use in the present invention and is preferably employed in the novel etchant compositions containing about 25 to 35 weight percent sulfuric acid 96%,
5 to 15 weight percent ferric nitrate and
50 to 70 weight percent water.

The process of the present invention can be accomplished by contacting the aluminum with a novel etchant solution for a suitable period over a wide range of temperatures, e.g. from 10° C. to 100° C. for about 5 to 30 minutes.

The following examples illustrate the process and compositions of the present invention.

Example 1

Preparation of P2 Etchant (U.S. Pat. No. 4,212,701)

370 grams of sulfuric acid 96% sp. gr. 1.84 were slowly stirred into 500 milliliters of deionized water. 150 grams of ferric sulfate 75% ($Fe_2(SO_4)_3 \times H_2O$ were then added. The resulting mixture was diluted to a volume of one liter with deionized water and stirred until a complete solution was obtained. The etchant composition thus produced contained approximately 28.7% by weight 96% sulfuric acid, 11.6% by weight ferric sulfate 75% and 59.7% by weight water.

Example 2

Preparation of P3 Novel Etchant.

The procedure of Example 1 was repeated except that 153 grams of ferrous sulfate ($FeSO_4 . 7H_2O$) were employed in place of the ferric sulfate. The etchant composition thus produced contained approximately 29.3 weight % sulfuric acid 96%, 12.1 weight % ($FeSO_4.7H_2O$=6.6 weight % anhydrous $FeSO_4$ and 58.6 weight percent water.

Example 3

Preparation of P4 Novel Etchant.

The procedure of Example 1 was repeated except that 66 grams of anhydrous magnesium sulfate ($MgSO_4$) were employed in place of the ferric sulfate. The etchant composition thus produced contained approximately 30.9 weight % sulfuric acid 96%, 5.5 weight % magnesium sulfate and 63.5 weight % water.

Example 4

Preparation of P5 Novel Etchant.

The procedure of Example 1 was repeated except that 222 grams of ferric nitrate ($Fe(NO_3)_3.9H_2O$ were employed in place of the ferric sulfate. The resulting etchant composition contained 28.6 weight % sulfuric acid 96%, 17.2 weight % ferric nitrate ($Fe(NO_3)_3.9H_2O$=10.3 weight % anhydrous $Fe(NO_3)_3$ and 54.2 weight % water.

A control SD etchant solution of aqueous sulfuric acid was prepared in similar manner except that no metal salt was added in order to study the effect of sulfuric acid in the absence of a metal salt.

Table 1 sets forth the compositions of the etchant solutions thus prepared.

TABLE 1

| Materials | P2 | P3 | P4 | P5 |
|---|---|---|---|---|
| Sulfuric acid 96% | 370 | 370 | 370 | 370 |
| Ferric sulfate 75% | 150 | | | |
| Ferrous sulfate $FeSO_4.7H_2O$ | | | 153 | |
| Magnesium sulfate $M_gSO_4$ | | 66 | | |
| Ferric nitrate $Fe(NO_3)_3$ | | | | 222 |
| Deionized water to make | 1 liter | 1 liter | 1 liter | 1 liter |

Etching Procedure

The etchant solutions prepared above were employed to etch finger panels of bar or clad aluminum 2024T3 of 1/16 inch thickness, which had been carefully cleaned with acetone to remove dirt, grease and fingerprints. The aluminum 2024T3 had the following composition:

4.5% Cu; 1.5% Mg; 0.6% Mn; 93.4% Al.

The panels were then immersed for 11 minutes in the etchant solutions preheated to and maintained at 150° F.±5° F. Immediately after removal from the etching bath. The panels were immersed in tap water for two minutes, sprayed with deionized water at room temperature to rinse off the tap water, then dried at 140° F. for 35 minutes in an air circulating oven and cooled to room temperature.

Bonding Procedure

The panels were adhesively bonded to form a single lap joint in each case. Prior to etching the panels had been cut and drilled to produce the desired 1×0.5 in. bonding area. For each bonded panel a one inch wide strip of adhesive was laid across the bonding area to insure complete coverage of the desired one half inch area. The adhesive employed was a thermosetting epoxy film adhesive EA9628NW, marketed by Hysol Corp., Olean, NY, which was cured at 250° F. for one hour at 25 psi. maintained on the bonded panels in a heated press.

The bonded specimens were tested for wear strength and stressed durability, as described below.

Shear Strength Tests

The shear strength tests were carried out at temperatures of 73° F. (room temperature) and 140° F. at about 50% relative humidity but otherwise essentially according to the method described in ASTM D1002-72 Standard Method of Test For "Strength Properties of Adhesive in Shear by Tension Loading (Metal-to-Metal)" to provide control data. Six replicates were run in each case.

The test results are set forth in FIG. 1 wherein average values of shear strengths were employed. The results show that at both room temperature and at 140° F. the bonds obtained with the P5 etchant containing ferric nitrate are closely similar to those obtained with the P2 etchant containing ferric sulfate and significantly superior to the bonds obtained with the P3 and P4 etchants containing ferrous sulfate and magnesium sulfate, resp. as well as the SD sulfuric acid control etchant containing no metal salt. While the results show that the bonds obtained with the P3 and P4 etchants possess equal or slightly inferior shear strength as compared to those obtained with the control SD sulfuric acid etchant, they possess superior stressed durability, as shown below. Experience has shown that the shear strength test is a less reliable procedure than the stress durability test for discriminating and determining the effectiveness of surface treatments for adhesive bonding.

Stressed Durability Tests

Each bonded specimen was placed in a spring-loaded jig and subjected in a chamber to a temperature of 60° C. (140° F.) and condensing humidity essentially according to the method described in 20 ASTMD29-19-71, Standard Recommended Practice For Determining Durability of Adhesive Joints Stressed in Shear by Tension Loading. The loads applied were determined by using the shear strength control values at 140° F. The specimens were loaded at 50%, 40%, 30% and 20% of the average 140° F. shear strength, using five replicates in each case.

Figure 2:
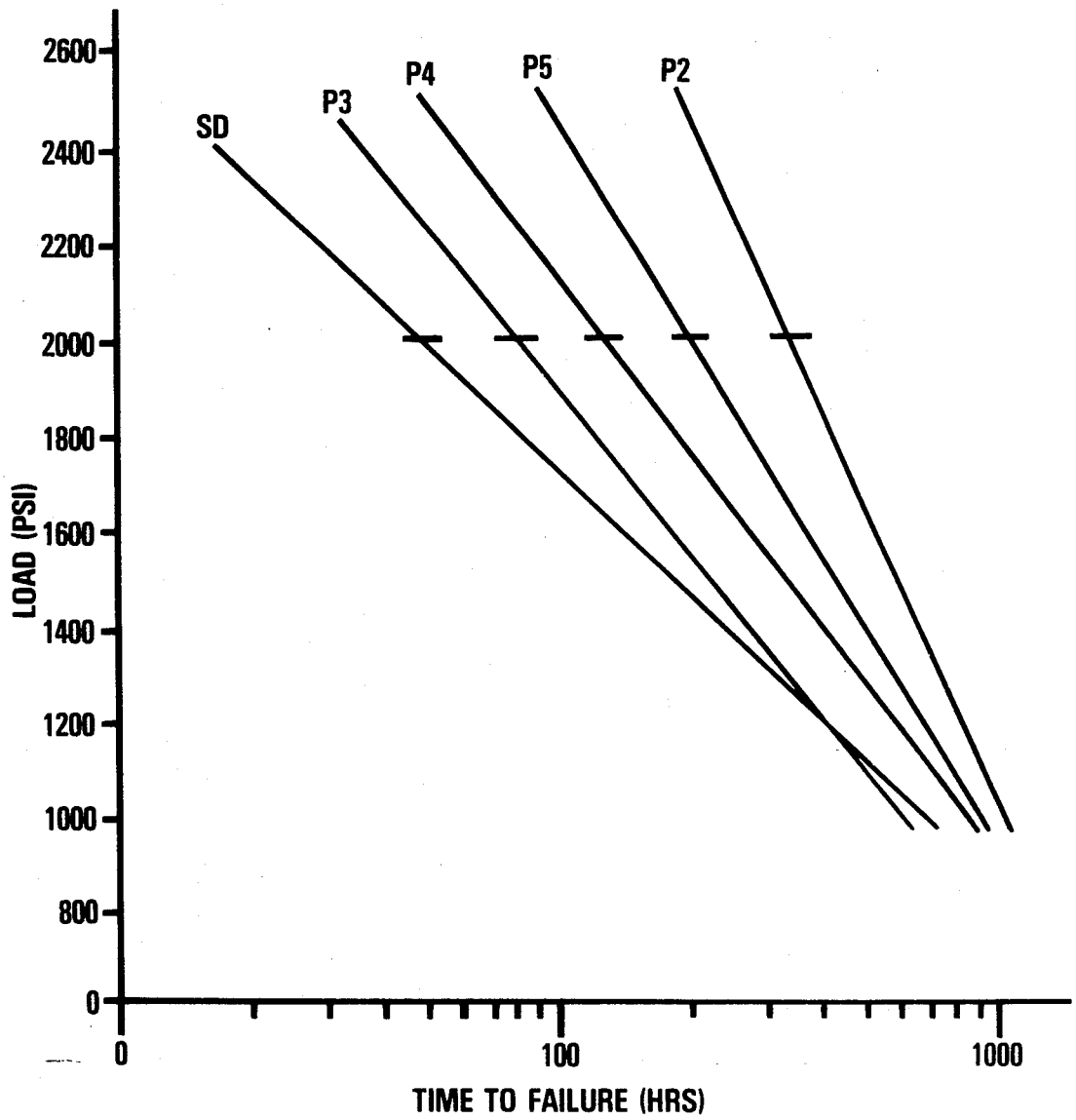
FIG. 2 and FIG. 3 set forth graphical comparisons of the stressed durability of adhesive bonds obtained with etchants of the present invention and prior art etchants.
Figure 3:
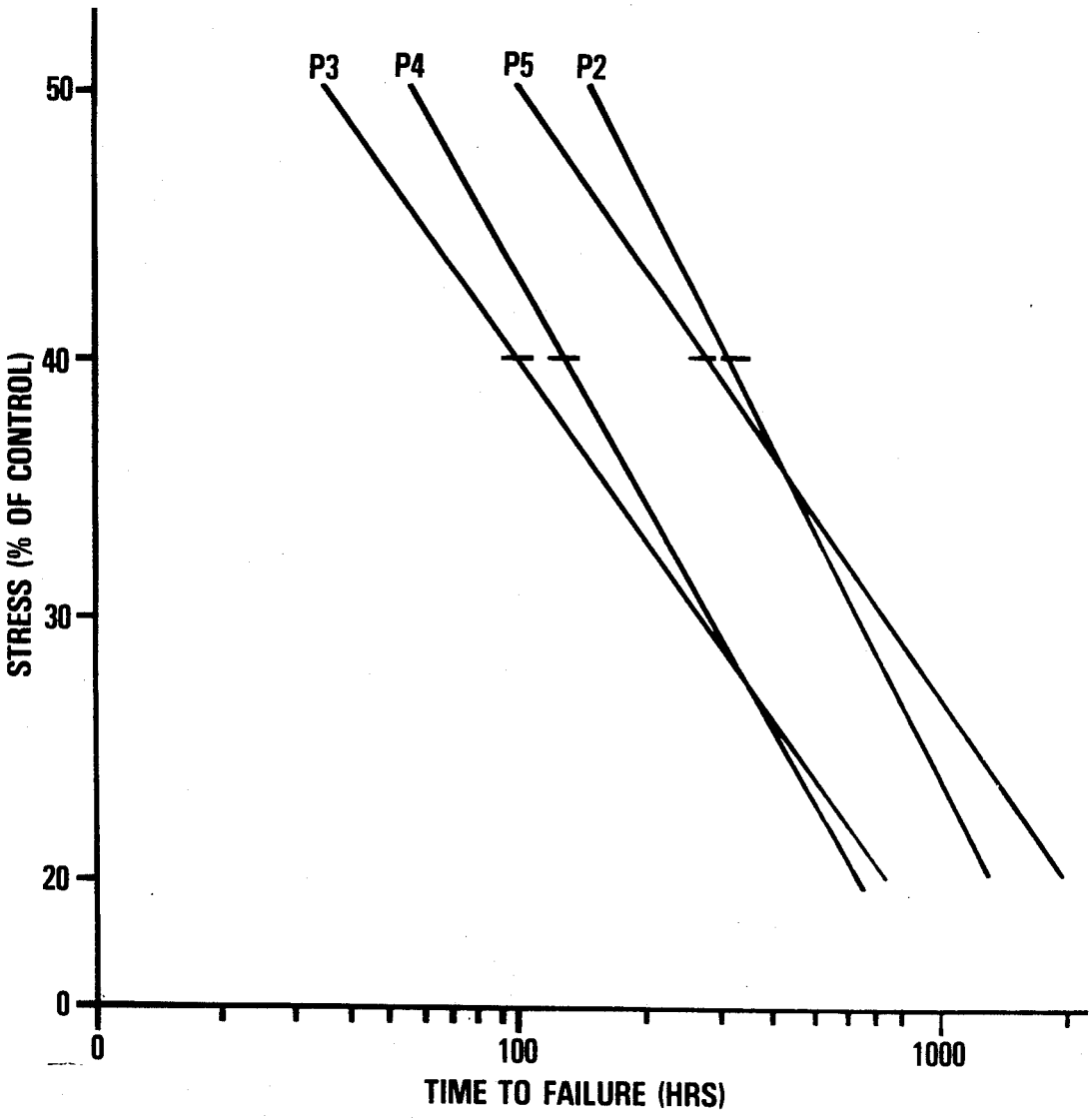

FIGS. 2 and 3 set forth graphically the stressed durability results for the 2024T3 bare or clad aluminum containing the aluminum clad on a copper base. (Identical results are obtained since the copper base is not exposed by the etching treatment). These figures show that at the higher stress levels the sulfuric acid etchants containing a) ferric sulfate P2, ferric nitrate P5, ferrous sulfate P3 and magnesium sulfate P4 are more effective than sulfuric acid alone SD;

b) ferric sulfate and ferric nitrate are substantially superior to ferrous sulfate and magnesium sulfate, suggesting that salts containing the metal cation in a higher oxidation state are more effective;

c) ferric nitrate is only slightly less effective than ferric sulfate, suggesting that no further advantage results from the use of a more strongly oxidizing anion when the salt contains the metal cation in a higher oxidation state.

Prior to bonding the etched surfaces were examined by use of the scanning electron microscope (SEM). The SEM pictures thus obtained revealed that the P2 and P5 etchants containing either ferric sulfate or ferric nitrate produced much larger pitting on the surface than the less effective etchants P3, P4 and SD. In view of the foregoing bonding and other results it appears that such greater pitting provides an increased surface area and sites for mechanical interlocking and thereby promotes adhesive bonding.

The foregoing disclosure and drawings are merely illustrative of the principles of this invention and are not to be interpreted in a limiting sense. We wish it to be understood that we do not desire to be limited to the exact details shown and described because obvious modifications will occur to a person skilled in the art.

What is claimed is:

1. A composition for etching aluminum preparatory to adhesive bonding, which consists essentially of about 25 to 35 weight percent sufuric acid 96%

5 to 15 weight percent ferric nitrate 50 to 70 weight percent water.

2. A process for adhesive bonding of aluminum parts, wherein the aluminum parts prior to bonding are subjected to an etching treatment to produce a surface preparatory to epoxy resin adhesive bonding, which comprises contacting the aluminum part with an etchant composition consisting essentially of aqueous sulfuric acid and an effective amount to improve the bond strength of a soluble, non-carcinogenic, non-polluting metal salt selected from the group consisting of ferric nitrate, ferrous sulfate, magnesium sulfate or mixtures thereof.

3. A process according to claim 2, wherein the metal salt is ferric nitrate.

4. A process to claim 2, wherein the etchant composition consists essentially of about 25 to 35 weight percent sulfuric acid 96%

5 percent to a saturated solution of said salt.

50 to 70 weight percent water.

5. A process according to claim 3, wherein the etchant composition consists essentially of about 25 to 35 weight percent sulfuric acid 96%

5 to 15 weight percent ferric nitrate 50 to 70 weight percent water.

* * * * *